(No Model.)
T. N. BARNES.
BAKING APPARATUS.
No. 435,723. Patented Sept. 2, 1890.
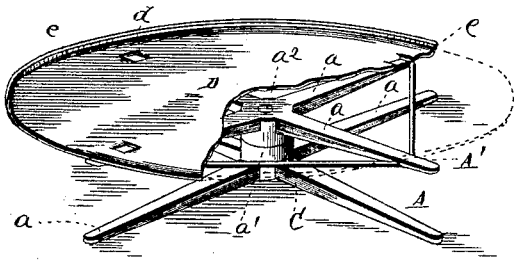
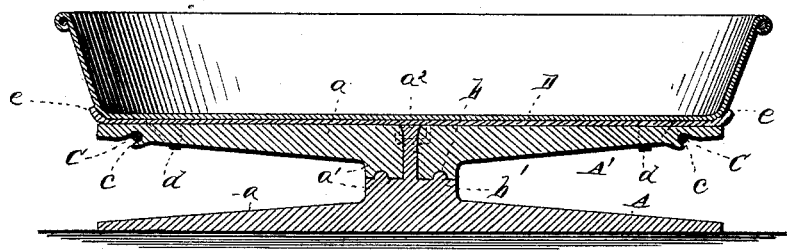
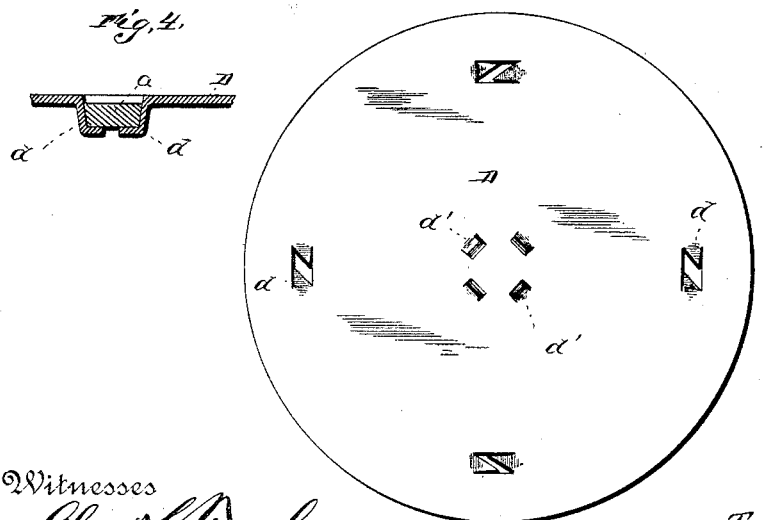
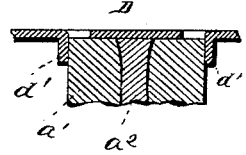
Witnesses
Inventor
T. N. Barnes,
By his Attorney

UNITED STATES PATENT OFFICE.

THOMAS N. BARNES, OF WESTON, WEST VIRGINIA, ASSIGNOR OF ONE-FIFTH TO JACOB KOBLEGARD, OF SAME PLACE.

BAKING APPARATUS.

SPECIFICATION forming part of Letters Patent No. 435,723, dated September 2, 1890.

Application filed April 24, 1890. Serial No. 349,349. (No model.)

*To all whom it may concern:*

Be it known that I, THOMAS N. BARNES, a citizen of the United States, residing at Weston, in the county of Lewis and State of West Virginia, have invented certain new and useful Improvements in Baking Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improved apparatus for baking purposes; and it has for its object to provide for the ready shifting of the position of the bake-pan, so as to effect the quick shifting of any part of its contents from a highly-heated part of the oven-chamber and present it to a less highly-heated part thereof, and vice versa, as required in conducting the baking operation, and as a further object to provide for effecting this shifting of the bake-pan with its contents in such manner as not to disturb the latter, the same remaining intact, and also to provide for the thorough "soaking" of the contents of the bake-pan; and the invention consists in the combination of parts, as will appear hereinafter from the specification, drawings, and claims.

In the accompanying drawings, in which the same reference-letter is used to designate the same part, Figure 1 is a broken perspective view of my invention. Fig. 2 is a sectional elevation of the same with a bake-pan in position thereon as when in use. Fig. 3 is a plan view of the plate or disk secured to the upper support or turn-table, and Figs. 4 and 5 are detail sectional views of my invention.

In the embodiment of my invention I provide two spider-like castings or supports A A' in their general outlines the counterparts of each other and one mounted upon the other, the lower one A being stationary and in practice resting upon the bottom of the oven-chamber of the stove and the upper one constituting a turn-table. Each of these supports or castings comprises a series of radial arms $a$ $a$, radiating from a central hub $a'$, the lower arms having flat widened bottom surfaces for stability, while the upper arms have flat widened upper surfaces to afford a greater area of supporting-surface. The hubs $a'$ are provided one in its upper surface with an annular groove $b$, and the other in its lower surface with a corresponding ring $b'$, engaging or fitting in said groove to render the movement of the turn-table steady, while the two hubs are connected together by a pin or pivot $a^2$, cast with the lower hub and extending into the bore of the upper hub and spread or beaded at its upper end, so as to prevent the detachment or displacement of the turn-table and yet allow the latter to turn. The outer ends of the arms of the upper support or turn-table A' are braced by means of a stout wire C, which extends through and is held in inwardly-inclined notches $c$ in the under side of said arms near said ends thereof. In lieu of this arrangement of the bracing-wire, it may be applied to the extreme outer ends of the arms and encircle the table or support.

D is a circular or disk-shaped plate secured upon the upper support or turn-table A', it being stamped or struck up with flanges $d$ near its outer edges, which embrace the arms of said support, and with flanges $d'$ around its center, which rest or bear against the sides of the hub of said arms, thus without the aid of other fastenings securing said plate or disk upon said support against displacement or detachment, making it a fixture thereof. The plate or disk D has an upturned marginal edge $e$, which prevents liability of the bake-pan, which sets or rests thereon, from being shoved beyond the edge thereof, and serves to centralize the pan upon said plate. It is obvious that with the use of this device the bake-pan, with its contents—as, for instance, a cake or other pastry—can be readily shifted or adjusted by revolving the turn-table or upper support the required extent, so as to remove any portion of said contents that may be baking too rapidly or more rapidly than the rest of said contents from the highly-heated portion of the oven, and be presented to a less highly-heated portion of the latter, thus avoiding the "burning" of said contents at any point, whereby it is evident that the operation of baking the contents of the bake-pan can be conducted with uniformity; also, that the baking operation can be effected without disturbing or touching the contents of the bake-pan until said operation or the baking is wholly concluded, thus avoiding the liability of breaking or spoiling said contents, while by the bottom of the bake-pan being removed from direct contact with the oven-bottom and a suitable distance above it, said contents are permitted to thoroughly "soak" without incurring liability of burning the bottom of said contents.

Having thus fully described my invention, what I claim, and desire to secure by Letters Patent, is—

1. The baking device or apparatus comprising the lower stationary spider-like support, the upper revolving spider-like support mounted upon said stationary support, and the disk or plate struck up or provided with flanges engaging the arms and hub of said revolving support or turn-table, substantially as specified.

2. The baking apparatus or device consisting of the stationary spider-like support, the revolving spider-like support or turn-table, said supports having central hub provided with engaging circular groove and ring, and one with a pivot extending through a passage in the other, the plate or disk having an upturned marginal edge and flanges struck up therefrom and engaging the hub and arms of the upper or revolving support or turn-table, and the brace engaging inwardly-inclined notches in the lower edges or surfaces of said arms near their outer ends, substantially as set forth.

In testimony whereof I affix my signature in presence of two witnesses.

THOMAS N. BARNES.

Witnesses:
 JAS. L. STEALEY,
 LEWIS L. DODSON.